(12) United States Patent
Kwok

(10) Patent No.: US 9,197,670 B2
(45) Date of Patent: Nov. 24, 2015

(54) METHOD AND APPARATUS FOR CREATING CONDITIONAL WINDOWS PROCESS TOKENS

(71) Applicant: Centrify Corporation, Sunnyvale, CA (US)

(72) Inventor: Hon Wai Kwok, Sunnyvale, CA (US)

(73) Assignee: CENTRIFY CORPORATION, Sunnyvale, CA (US)

( * ) Notice: Subject to any disclaimer, the term of this patent is extended or adjusted under 35 U.S.C. 154(b) by 234 days.

(21) Appl. No.: 14/049,171

(22) Filed: Oct. 8, 2013

(65) Prior Publication Data

US 2015/0101020 A1 Apr. 9, 2015

(51) Int. Cl.
*H04L 29/06* (2006.01)

(52) U.S. Cl.
CPC ............... *H04L 63/20* (2013.01); *H04L 63/08* (2013.01)

(58) Field of Classification Search
CPC .................................. H04L 63/20; H04L 63/08
See application file for complete search history.

(56) References Cited

U.S. PATENT DOCUMENTS

| 8,024,770 B2 | 9/2011 | Fee et al. | |
| 2011/0296502 A1* | 12/2011 | Peretti | 726/4 |

* cited by examiner

*Primary Examiner* — Jeffrey Pwu
*Assistant Examiner* — Thong Truong
(74) *Attorney, Agent, or Firm* — Blakely Sokoloff Taylor & Zafman LLP

(57) ABSTRACT

A system and method for taking control of process token creation in the Windows operating system to create conditional process tokens that define access to system resources for process running on a Windows computer. The system includes an LSA shim layer that intercepts standard Windows requests for authentication and authorization and an authentication agent that determines context for each request. A custom authentication and authorization (A&A) store determines authentication success and the amount of authorization based on context and supplied credentials. Once the custom A&A store determines a successful log-on and defines authorization for the user, it passes the elements of authorization through the authentication agent to the LSA shim layer, which passes them on to the LSA module, which in turn uses them to request a Windows process token from the Windows kernel. The Windows kernel assigns the token to a user's session on the computer, defining the level of resource access available to processes the user launches.

22 Claims, 3 Drawing Sheets

Figure 1: Prior Art

METHOD AND APPARATUS FOR CREATING CONDITIONAL WINDOWS PROCESS TOKENS

BACKGROUND

The Windows operating system implements an authentication and authorization system that allows a user to take actions on a computer according to his or her permissions on that computer.

User Permissions

A user name identifies a user working on a Windows computer for authentication and authorization. Windows recognizes all actions taken and all processes started by the user as belonging to that user, and allows only actions and resource uses that are permitted to that user. A user may not have permission to open certain files, for example, or to start some services on the computer.

A user may belong to multiple groups. If so, his permissions are a combination of the permissions granted by those groups. A user may also have permissions granted through Windows privileges. These permissions mechanisms work in different ways:

a) A user's group memberships are typically defined by a directory service such as Active Directory. The directory service defines groups of users, each group with a set of permissions that apply across a group of computers on which the users may log on. An admin group, for example, may have extensive permissions for using computer resources, while a sales group may have limited permissions.

b) A user's Windows privileges are defined on a single computer and apply to the user only when he is logged onto that computer. If a user's Windows privileges and group permissions conflict, Windows privileges prevail over group permissions.

Note that as the Windows environment evolves, new permission-definition mechanisms may appear such as claim-based rights in Windows 8. Implementations of the invention as described later can handle these other mechanisms.

Process Permissions

Each process that a user starts, such as an application or the desktop, which is started by the user's log-on, may only operate under the permissions of the user that started it. When a process attempts to use a resource on a Windows computer, the Windows kernel ensures that the process can only use resources for which the process's user has permission. If, for example, user John Doe does not have permission to change firewall settings, then if he opens a command prompt, he cannot use that process to change firewall settings.

Within a user's desktop session, Windows offers a "Run As . . . " command, typically found in the Start menu or by Shift-right-clicking an application icon, that allows a user to start a process as a different user. This is, in effect, a secondary log-on that supplies a new user name to identify a new user with an accompanying password. Windows determines the permissions for that new user. The process then operates under the new user's permissions.

Run As allows a user to execute a process using different permissions within a single session. John Doe may, for example, execute a command prompt as user "admin" so that he has that user's permissions to change firewall settings. If John Doe starts other processes outside the command prompt after that, Windows assigns John Doe's normal permissions to those processes. The Run As start applies only to the process started that way.

Other Permissions

Windows notes a user's permissions in other situations as well, situations that may expand as Windows evolves. For example, when a user on one computer connects to a second computer to use resources on the second computer, Windows' connection mechanisms apply the user's name and group membership to any process threads on the second computer that carry out the user's requests. The Windows kernel determines the thread's permissions based on the provided user information. These thread permissions are as important in cross-network actions as process permissions are on a single computer.

Windows Permissions Mechanisms

Windows uses a variety of mechanisms to handle authentication and authorization. Embodiments of the invention work with these mechanisms.
Process Tokens
Whenever a user starts a process, Windows assigns a process token to the process. The process token is a data structure that provides user information that Windows uses to define permissions for the process. Token data includes, among other things:

a) The user name of the user who started the process.
b) A list of all groups to which the user belongs.
c) A list of all Windows privileges the user has on this computer.

When a process attempts to use resources on the Windows computer, the Windows kernel first checks the process token to see if the process has permission to use those resources. The kernel reads the group memberships listed in the token and looks up the permissions associated with those groups. The kernel also reads the Windows privileges listed in the token and reconciles them with the group permissions.

The first of a user's processes to receive a process token is the desktop, Explorer.exe, which launches when the user first logs on. All subsequent processes started during that user's session receive the same process token identifying the user and his permissions. If a user uses Run As to execute a new process, Windows creates a new process token based on the new user name provided in Run As. Windows reads the new process token to define permissions for the new user name, not for the original user, so the process executes with a different set of permissions.

Note that process token data includes many other data types in addition to those listed above, and may grow to include new types of authorization data as the Windows environment evolves. The process token continues, however, to be the mechanism that Windows uses to convey authorization data no matter what that data may be.
Thread Tokens
If a user connects to a second computer to use resources there, the connection process uses one or more server threads on the second computer to respond to the user's requests. The connection process passes user information that includes the user's name and the user's group memberships. The second computer uses that information to create a thread token, very similar to a process token, that defines the requesting user's user name and a list of all groups, provided by Active Directory, to which the user belongs. The thread token also contains locally determined Windows privileges for the user.

Windows assigns the thread token to the thread handling the user requests, and the Windows kernel checks the thread token as the thread executes to ensure that the thread operates correctly under the user's permissions.

The LSA Module

The Local Security Authority (LSA) module in Windows handles all security-related operations on a Windows computer including each user's log-on, security tokens for any processes he launches, and thread tokens for any network connections from a requesting user. To authenticate a user and determine his group memberships and Windows privileges, the LSA module may contact two different sources of authentication and authorization data:

a) Active Directory, a Microsoft directory service available through a network connection. Active Directory defines domain user accounts (user names and accompanying passwords), group membership, and permissions for each group.

b) The LSA store, a local data store on the computer that stores local user accounts (user names and passwords for users defined on this computer) along with Windows privileges granted to each of those users. The LSA store also contains cached Active Directory information that includes domain user log-on information for users who have logged on to this computer including group memberships and group permissions. The LSA store uses the cached Active Directory data for authentication and authorization when the computer is not connected to the network for Active Directory service.

The LSA module authenticates a user at log-on and gives the Windows kernel authorization data determined at log-on. The kernel creates a process token based on the provided user name with its associated group memberships and Windows privileges. The kernel then assigns that process token to the desktop and all other processes spawned normally by that user. All these processes run with the same process token, so Windows determines the same permissions for each of these processes.

If a user starts a new process using Run As, the LSA module authenticates and provides authorization data; the Windows kernel creates and assigns a new process token to that process. Windows grants that process permissions based on its process token.

When a network connection from a requesting user on another computer comes into this computer, the LSA module determines local group membership and Windows privileges based on the LSA store of the local computer and then provides the information to the Windows kernel, which creates a thread token based on that information. The Windows kernel assigns the thread token it creates based on that information to the server thread serving the connecting user.

LSA Module Plug-Ins

The LSA module is designed by Microsoft to accept software plug-ins that the LSA module can call to perform additional authentication. Third-party plug-ins allow authentication through non-Microsoft-standard sources such as an organization's own custom directory service.

Windows uses the plug-in architecture by implementing its own authentication and authorization as a set of LSA module plug-ins. In recent versions of Windows, the LSA module calls the Microsoft plug-in LogonUserEx2 to authenticate a user. Windows versions previous to Windows XP or Windows 2000 may use a different plug-in that in essence works the same way. The Microsoft plug-ins use Active Directory and the local LSA store for authentication and authorization.

Problems with Prior Art

Log-on and permissions in the standard Windows environment have drawbacks.

No Conditional Permissions at Authentication

Standard Windows authentication and authorization considers only limited conditions at authentication events such as log-on or a Run As process launch: the user's provided password, the computer and domain where log-on takes place, and the time and date of log-on.

If the user has permission for authentication on the current computer in the current domain, he's given a set of group memberships and Windows privileges that cannot vary depending on where he's authenticating or on what other non-standard conditions exist at the time of authentication.

Network administrators may want to refine authentication and authorization to take into account a much broader set of conditions. These conditions make managing users on networks much more flexible.

Administrators may, for example, wish to grant authentication or permissions that only apply on computers audited by auditing software so that a user with many powerful permissions may only authenticate on audited computers. Or administrators may want to consider other custom conditions such as to which zone the current computer belongs (a zone is a computer grouping used for network security), what role a computer plays (if it's a web server, for example, or a personal desktop computer), what applications are currently running on the current computer, and any of many other possible conditions.

Standard Windows authentication and authorization does not define this kind of conditional authentication and authorization, and does not allow checking any extra conditions during authentication. This severely limits authentication and authorization options.

Difficult Access to Token Creation

Windows standard authorization does not allow a process or thread to have outside access to token creation and token assignment. Standard Windows events that trigger token creation and assignment are user log-on, Run As, and a user network connection to a second computer. If an outside process wants to spawn another process or thread and assign a new token to it, it cannot do so through standard Windows authorization mechanisms. Only the Windows kernel may assign a process token or thread token to a process or thread.

Without outside access to token creation and assignment, it's very difficult to create applications that provide custom authorization service. An example of such an application is one that determines different sets of permissions that a qualified user may use. The application allows the qualified user to change permissions for a new process without providing a user name and password each time.

SUMMARY OF THE INVENTION

Embodiments of this invention take control of process token creation in the Windows operating system to create conditional process tokens for processes on a Windows computer. Although this description assumes a Windows operating system environment, the disclosed concepts can be applied to other operating system environments which utilize authentication and authorization services and process tokens. A conditional process token takes into account conditions on a computer when the token is created. These conditions include but are not limited to the type of computer, what software processes are running on the computer, and whether or not the computer is audited by auditing software.

Embodiments of this invention create a conditional process token whenever the Windows operating system requests a new process token. This typically occurs when a user logs onto the computer or switches user accounts to start a process such as a word processor or a command prompt. The conditional process token defines permissions that the user's processes have when running on a Windows computer. Embodiments of the invention determine those permissions based on computer conditions when the conditional process token is requested. A user's process may, for example, be prohibited from changing firewall settings if an embodiment of the invention determines that the computer is a web server when it creates a conditional process token for the user at log-on.

The Windows operating system does not take into account computer conditions beyond date and time when it creates its own process tokens. By replacing Windows' process token creation with conditional process token creation, an embodiment of the invention adds many other computer conditions to consider at token creation and may expand on those conditions as important new conditions arise.

Because embodiments of the invention provide an independent means of triggering process token creation (beyond Windows' standard token requests at log-on and user account change), embodiments of the invention provide a method for processes to change permissions outside of standard Windows methods.

Embodiments of the invention use a set of components to create a custom authentication and authorization service that intercepts and overrides Microsoft's standard authentication and authorization through the LSA modules. The components are:

a) The authentication agent, a custom Windows service that performs custom authentication and authorization when requested by the LSA shim layer or knowledgeable processes (both described later). The authentication agent may also detect current conditions and use them for authentication and authorization. The authentication agent may be optional in some embodiments of the invention where the LSA shim layer (described following) performs its functions.

b) A custom authentication and authorization (A&A) data store that augments Microsoft's Active Directory and local data store to define additional conditions to meet before a user can log on and receive a set of permissions. The authentication agent uses the custom A&A data store to determine whether or not a log-on is successful and, if it is, what authorization is granted.

c) The LSA shim layer, an LSA module plug-in that intercepts standard Windows authentication and authorization requests to the LSA module and, if appropriate, uses the authentication agent to perform conditional authentication and authorization in place of standard Windows authentication and authorization. The LSA shim layer also returns authorization data that reflects conditional group memberships and privileges. The LSA module passes that data on to the Windows kernel, which creates a process or thread token based on that data.

The invention may support another optional set of components:

d) A set of knowledgeable processes, each of which knows of the existence of the authentication agent. These processes can use the authentication agent to perform special authentication and authorization tasks such as switching a permission set for a user in place of using Windows' standard "Run As . . . " command.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION OF THE INVENTION

Figure 1:
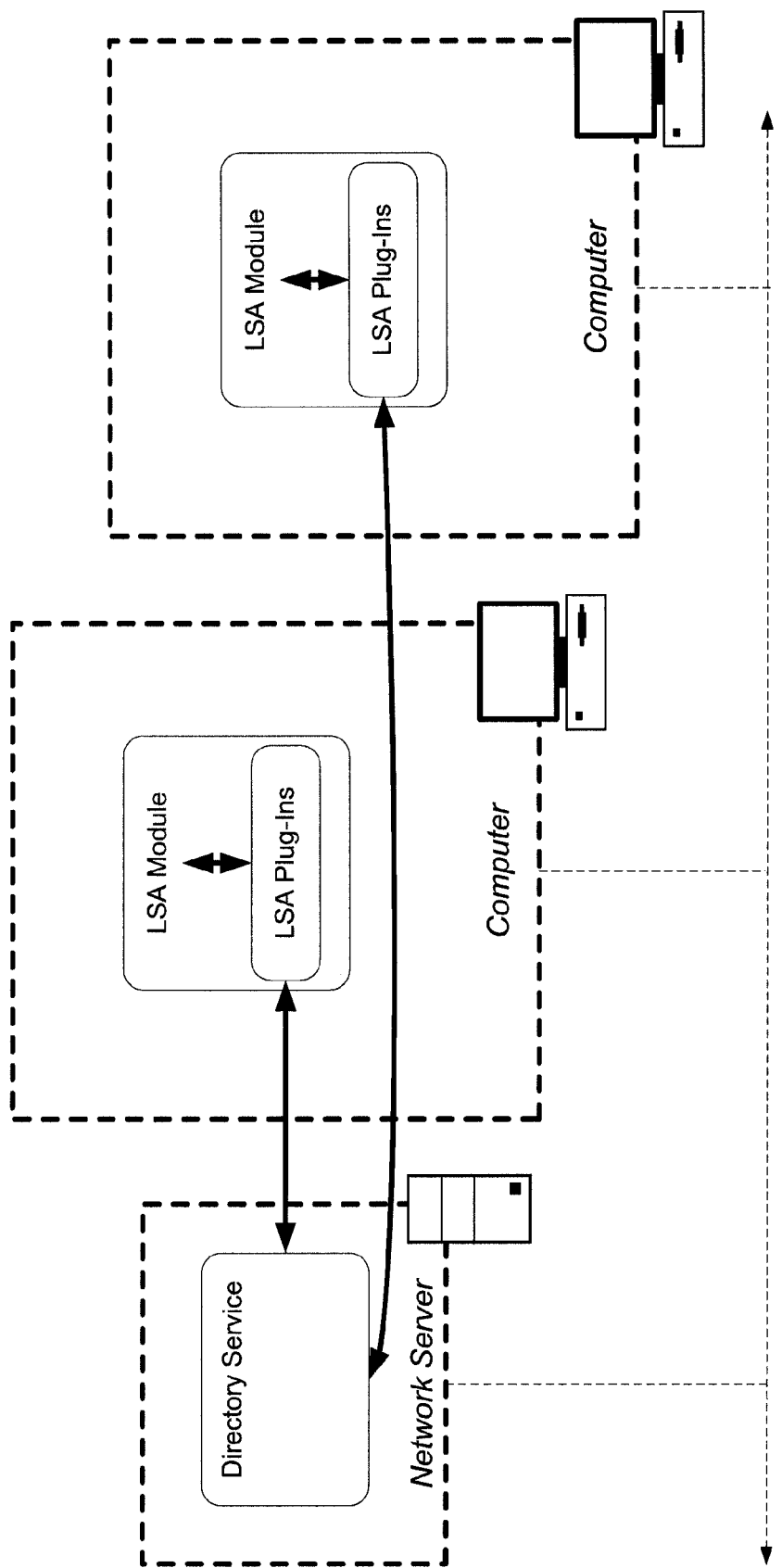
FIG. 1 is a block diagram that shows Windows standard authentication and authorization components as they exist in the prior art.
Figure 2:
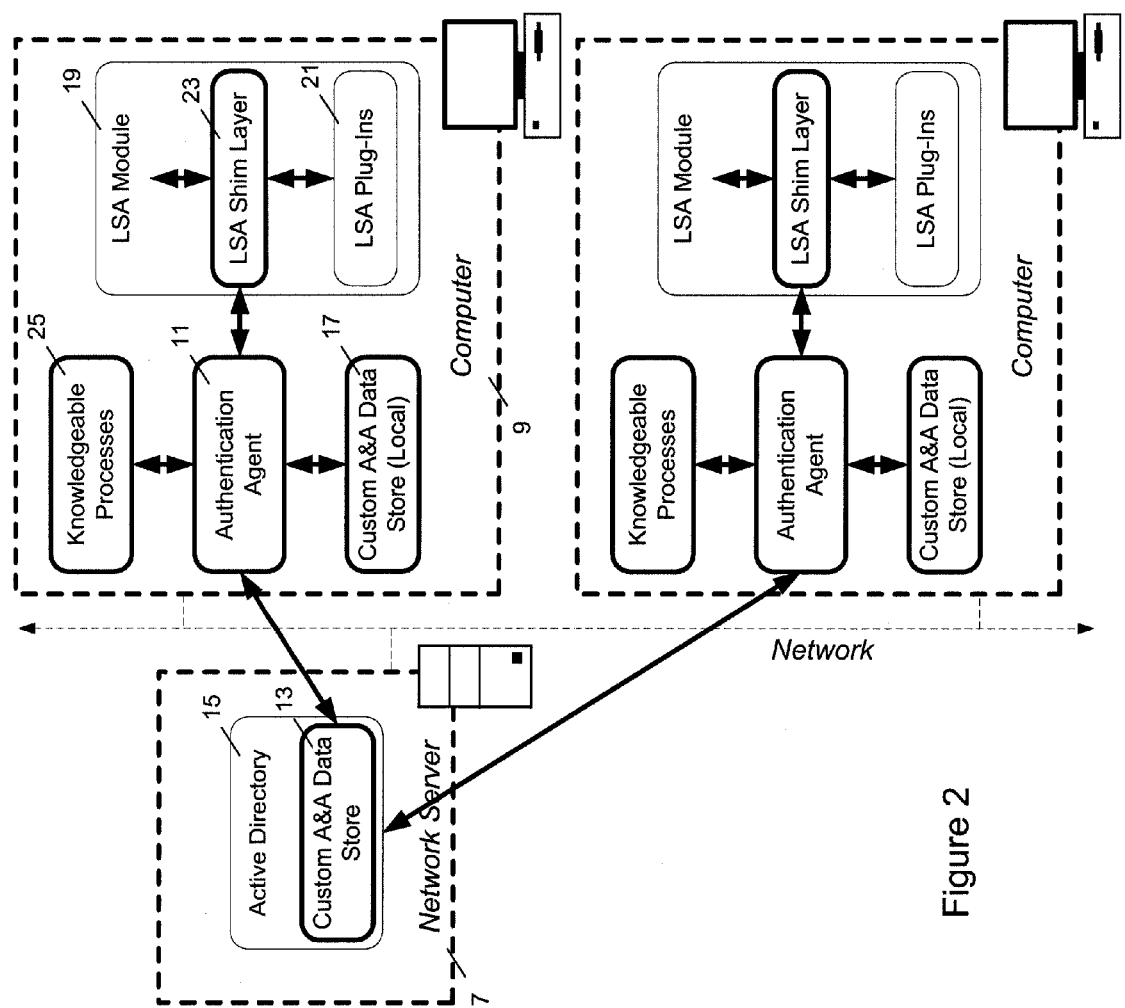
FIG. 2 is a block diagram that shows the components of an embodiment of the invention and their connections to each other and to existing components.

Embodiments of the invention perform their functions using components shown in FIG. 2.

The Authentication Agent

The authentication agent 11 is a custom Windows service that runs on each Windows computer 9 where an implementation of the invention resides. The agent may also be implemented as other process types and need not be a Windows service. The agent performs authentication and authorization for the LSA shim layer 23 when requested. The agent can also accept authentication and authorization requests directly from knowledgeable processes 25.

When the agent authenticates or authorizes, it contacts either the custom A&A data store 13 through a network connection or the local custom A&A data store 17 version located on the computer 9. The agent 11 acts on the definitions of conditional log-on, group membership, and Windows privileges that are stored in the custom data store 13 or 17.

The authentication agent 11 can perform custom actions that Windows' LSA module 19 cannot perform, such as changing a user's role (his permission set) without requiring re-authentication, or triggering an auditing process for a role change or other request.

The authentication agent 11 can also provide context information about the current computer. This information might be standard Windows context information such as time, date, operating system version, and running processes. The information might also extend to non-standard context such as the current zone in which the computer is enrolled, the computer role (whether it's a web server, a database server, an administration computer, or other computer type), whether the computer is audited by auditing software, and so on. The agent 11 uses the context information it gathers to grant conditional log-on, group membership, and Windows privileges.

Note that in other possible implementations of the invention some or all of the logic in the authentication agent 11 may be moved to the LSA shim layer 23. It's possible to implement the invention without an authentication agent if the shim layer performs all of the agent's functions.

The Custom Authentication and Authorization (A&A) Data Store

The custom A&A data store 13 defines all the authentication and authorization information that goes beyond Windows' standard A&A conditions. The stored information for each user includes:

a) Log-on conditions that must be met for a successful user log-on, such as types of computers where log-on is permitted, dates of the year, days of the week, and times of day when log-on is permitted, computer zones where log-on is permitted, other processes that must be running before log-on is permitted, and so on.

b) Permission conditions that define what user group memberships and Windows privileges the user may have under what conditions. Examples include groups and privileges that are granted for the user only on certain types of computers, groups and privileges granted only at certain dates and times, and so on.

The custom A&A data store may also include other custom authentication and authorization data such as user roles that a user may assume without logging on again. Each user role is a set of permissions associated with a role name. An admin role, for example, may include extensive permissions to work with multiple computers, while an operator role may be limited to a small set of permissions on only one or more computers. User roles include permission conditions that define when a user may assume a role. Custom data like this allows a knowledgeable process 25 such as a role-switching application to use the invention to change a user's permissions without requiring reentering a user name and password.

One implementation of the custom A&A data store 13 is an augmentation of the directory service Microsoft Active Directory 15 which runs on a network server 7. The implementation adds additional custom information to each user's Active Directory record. The A&A data store 13 may also be implemented on any other directory service or data store available through a network connection.

An implementation of the invention also extends the custom A&A data store 13 as a local data store 17 on the computer 9 where the authentication agent 11 is located. The local custom A&A data store 17 allows the authentication agent access to custom authorization and authentication data when the host computer is not connected to a network.

The LSA Shim Layer

The LSA shim layer 23 is a plug-in for the Microsoft LSA module 19. The shim layer 23 registers with the LSA module 19 when the software is installed. When the shim layer 23 registers, it first unregisters Microsoft's LSA plug-ins 21 and then registers itself 23, identifying itself as those plug-ins 21. The LSA module 19 then believes the LSA shim layer 23 is the standard Microsoft plug-ins 21, and calls the shim layer 23 instead of the Microsoft plug-ins 21.

The shim layer 23 keeps the Microsoft LSA plug-ins in 21 place and may call those plug-ins 21 whenever required. The shim layer 23 thus stands between the LSA module 19 and the Microsoft plug-ins 21, intercepting authentication and authorization calls whenever it wishes to process the calls, passing on other calls to the Microsoft plug-ins 21 when the shim layer 23 does not need to process the calls. When the Microsoft plug-ins 21 respond, the shim layer 23 passes the responses back to the LSA module 19. The shim layer 23 may, if desired, modify Microsoft plug-in 21 responses before passing them back to the LSA module 19.

Implementations of the invention can set the shim layer 23 to intercept and act on any number of authentication and authorization call types from the LSA module 19. Those calls may include, for example, LsaLogonUserEx2 API calls. The shim layer 23 passes on all other calls from the LSA module 19 to the Microsoft plug-ins 21. This ensures that the Microsoft plug-ins 21 correctly handle all other calls, and that when the Microsoft plug-ins 21 are updated with a security patch the updates work as intended.

Authentication and Authorization

When the shim layer 23 receives an LSA module 19 call to authenticate a user, the shim layer 23 contacts the authentication agent 11 and provides whatever current context information the shim layer 23 may have. The agent 11 can provide other current context information. The agent 11 determines whether or not it will approve authentication, which might be a log-on, a Run As process start, or accepting a network connection. If the log-on or process start is approved, the agent 11 returns information to the shim layer 23 that includes what group membership and what Windows privileges apply to the logged-on user, Run As user, or network-connected user.

Building a Process or Thread Token

When a log-on, Run As, network connection, or other authentication event succeeds, the shim layer 23 passes on to the LSA module 19 the user name along with the group memberships and privileges that the shim layer 23 received from the authentication agent 11. The LSA module 19 requests a process token from the Windows kernel and specifies the user name, group membership, and privileges it received from the shim layer 23. The Windows kernel 27 creates and stores a token for the user's session. If this is a log-on, the token is a process token that defines the user's group membership and Windows privileges that are applied to all processes the user launches from that point. If this is a Run As process start, the token is a process token whose definitions apply only to the started process. If this is a network connection thread handling a connected user, the token is a thread token whose definitions apply to that thread. Tokens may apply as well to other authenticated processes or threads.

Knowledgeable Processes

Implementations of the invention may support knowledgeable processes 25 that run on a Windows computer hosting an embodiment of the invention. These processes 25 know of the existence of an embodiment of the invention, and can use an embodiment of the invention to perform authentication and authorization tasks. These A&A tasks are not available through standard Windows authentication and authorization.

In one embodiment of the invention, a knowledgeable process 25 makes requests of the authentication agent 11 using a custom application programming interface (API). A process 25 may, for example, be a simple role-switching application that a user may use to start a new process instead of using Run As in Windows. When a user requests a role change, the process 25 uses the custom API to check the role change with the authentication agent 11. The authentication agent 11 checks with the custom A&A data store 13 and allows the role change if the data store 13 says the change is allowed for the user. If the role change is allowed, the agent 11 requests log-on by calling a function such as LsaLogonUserEx2 on the LSA module 19. The agent 11 passes the new membership role(s) and Windows privileges within the log-on function. The LSA module 19 passes the request to the shim layer 23, which recognizes the role change as part of the log-on request. The shim layer 23 requests a new custom process token from the LSA module 19, which requests a new token from the Windows kernel 27. The Windows kernel 27 assigns the new token to the newly started process.

Creating a Conditional Process Token at Log-On

Figure 3:
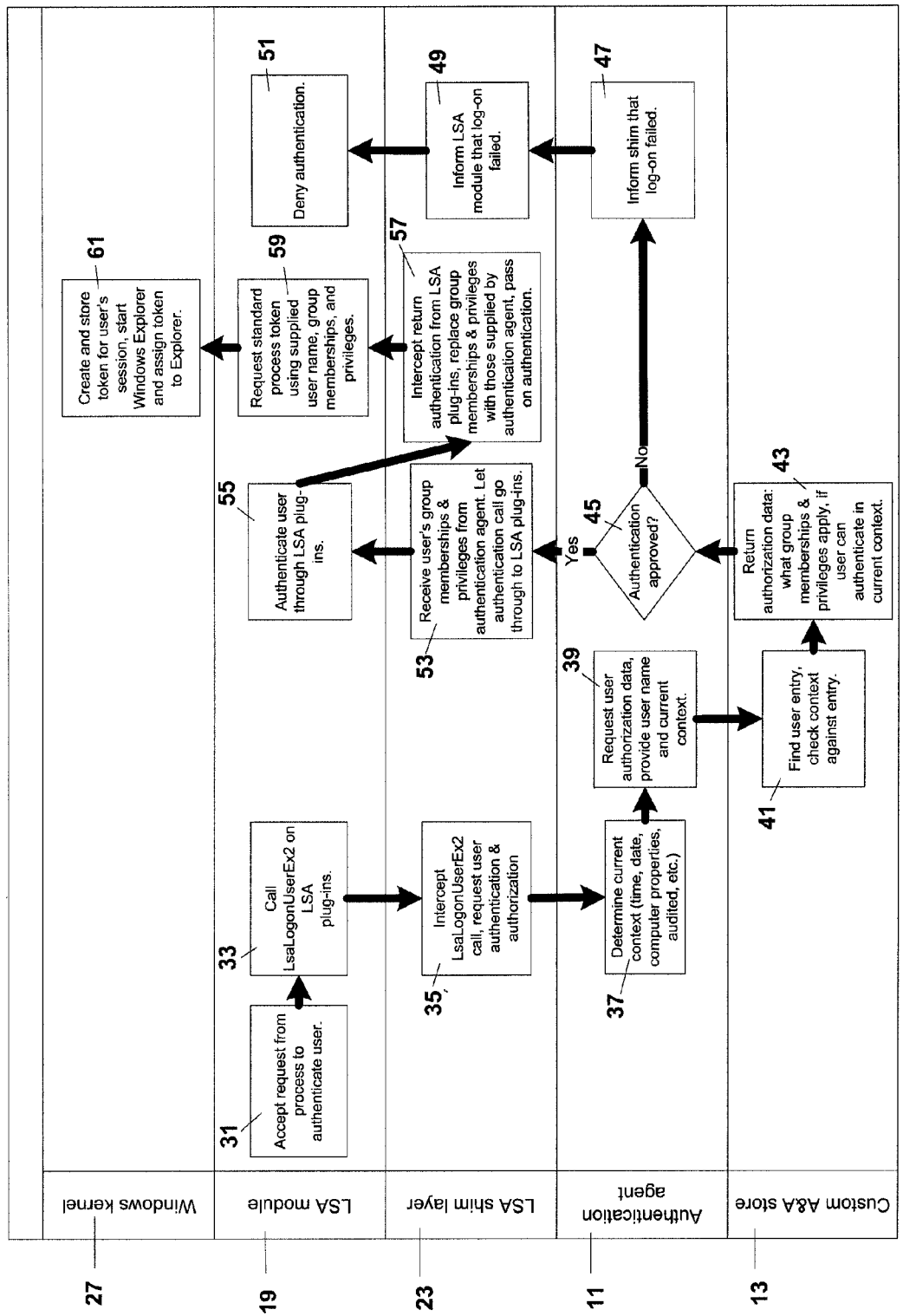
FIG. 3 is a flowchart that shows the processing that Windows components and components of an embodiment of the invention perform when a user logs on to a Windows computer.

FIG. 3 is a flow chart which illustrates the process that occurs when a user logs on to a Windows computer and how the invention handles the log-on.

The LSA module 19 accepts 31 a request from a process to authenticate a user. The request includes a user name and password from the user. The LSA module then requests 33 user authentication and authorization from its LSA plug-ins 21 by using the function call LsaLogonUserEx2.

The LSA shim layer 23 intercepts 35 the call intended for the plug-ins 21, and handles the call itself by requesting authentication and authorization through the authentication agent 11.

The authentication agent 11 determines 37 the current context in the computer in which it's running. It gathers much of that context by making standard queries of the computer for information such as the time and date, properties of the computer such as hardware configuration, a list of processes running on the computer, and so on. The agent 11 may also query software running on the computer for other aspects of current context. The agent 11 may, for example, query auditing software running on a computer to find out what level of auditing the software performs.

After the authentication agent 11 determines current context, it requests 39 user authorization data from the custom A&A store 13. The agent 11 provides the user name and the current context.

The custom A&A store 13 finds 41 a user entry that corresponds to the user identified in the credentials. The custom store 13 checks the current context against the user entry.

The custom A&A store 13 returns 43 authorization data that includes what group memberships and privileges apply to the user for the current context and whether or not the user is allowed to authenticate in the current context.

The authentication agent 11 uses the returned data to decide 45 if authentication is approved or not. If authentication is not approved, the authentication agent 11 informs 47 the LSA shim layer 23 that authentication failed. The LSA shim layer 23 informs 49 the LSA module 19 that authentication failed. The LSA module 19 then denies 51 authentication.

If the authentication agent 11 decides 45 that authentication is approved, the LSA shim layer 23 receives 53 the user's group membership and privileges from the authentication agent 11. The LSA shim layer then lets 53 the original authentication call from the LSA module 19 go through to the intended LSA plug-ins.

The LSA module's 19 LSA plug-ins 21 authenticate 55 the user. When the LSA plug-ins 21 return authentication, the LSA shim layer 23 intercepts 57 the authentication and replaces the group memberships and privileges the authentication contains with the group memberships and privileges supplied by the authentication agent 11. The LSA shim layer 23 then passes the modified authentication on to the LSA module 19.

The LSA module 19 requests 59 a standard process token from the Windows kernel 27 using the user name, group memberships, and privileges supplied in authentication returned by the LSA shim layer 23.

The Windows kernel 27 creates and stores 61 a process token for the user's session originally requested of the LSA module 19. This token is a Microsoft-standard process token that contains the user name, group memberships, and privileges among other data. Although this is a Microsoft-standard process token that the Windows kernel 27 uses to determine authorization for the users' processes, the token's contents were determined by the custom authorization and authentication process disclosed herein. If the process requesting authentication was for an initial user log-on, the Windows kernel 27 then starts Windows Explorer to present a desktop to the user and assigns the process token to Windows Explorer. All processes the user starts in a standard manner through Windows Explorer receive that process token to define the process's authorization to use computer resources.

Further details regarding Active Directory 15, the LSA module 19, and Microsoft LSA Plug-ins 21 are not set forth herein as such elements are well known in the art and while necessary for complete operation of the invention do not need to be modified for use with the invention.

An embodiment of the invention may be a machine-readable medium having stored thereon instructions which cause a processor to perform operations as described above. In other embodiments the operations might be performed by specific hardware components that contain hardwired logic. Those operations might alternatively be performed by any combination of programmed computer components and custom hardware components.

A machine-readable medium may include any mechanism for storing or transmitting information in a form readable by any type of processing device.

Although specific examples of how the invention may be implemented are described, the invention is not limited by the specified examples, and is limited only by the scope of the following claims.

I claim:

1. A system to create a custom authentication and authorization service that intercepts and overrides a standard authentication and authorization mechanism for computers connected to a network comprising:
   a local security authority module (LSA) shim layer running on each of a plurality of computers connected via a network;
   an authentication agent running on each of a corresponding one of said plurality of computers accepting authentication and authorization requests and perform authentication and authorization responses to said requests;
   a custom authentication and authorization data store storing authentication and authorization information other than or in addition to standard authentication and authorization information, wherein the stored authentication and authorization information for each user includes:
   a) log-on conditions that must be met for a successful user log-on; and
   b) permission conditions that define what user group memberships and privileges the user has under predetermined conditions;
   wherein the LSA shim layer:
   i) unregisters standard LSA plug-ins then register itself with an LSA module;
   ii) operates to intercept authentication and authorization calls intended for said standard LSA plugins to selectively process the intercepted calls and pass other calls to the standard LSA plug-ins; and
   iii) passes responses from the standard LSA plug-ins back to the LSA module.

2. The system defined by claim 1 wherein when the authentication agent authenticates or authorizes, said agent contacts said custom authentication and authorization data store through one of a network connection and a local connection.

3. The system defined by claim 2 wherein said agent contacts said custom authentication and authorization data store through said local connection when a network connection is unavailable.

4. The system defined by claim 1 wherein the authentication agent performs custom, non-standard actions including at least one of changing a user's role without requiring re-authentication, and triggering an auditing process for a role change.

5. The system defined by claim 1 wherein said authentication agent provides context information about said computer on which said authentication agent is running.

6. The system defined by claim 5 wherein said context information comprises standard context information provided by an operating system for the computer on which the authentication agent is running and non standard context information provided by third party processes running on the computer on which the authentication agent is running.

7. The system defined by claim 1 wherein at least some of the processing performed by the authentication agent is performed by the LSA shim layer.

8. The system defined by claim 1 wherein said permission conditions define user group memberships and privileges.

9. The system defined by claim 1 wherein the stored authentication and authorization information for each user includes custom authentication and authorization data including user roles a user may assume without logging on again.

10. The system defined by claim 1 wherein said authentication and authorization data store is an augmentation of a directory service adding additional custom information to each user's directory record.

11. The system defined by claim 1 wherein when the shim layer receives an LSA module call to authenticate a user, the shim layer contacts the authentication agent and the authentication agent provides predetermined current context information available to the shim layer.

12. The system defined by claim 1 wherein the shim layer modifies plug-in responses before passing them back to the LSA module.

13. The system defined by claim 1 wherein the shim layer intercepts and acts on authentication and authorization call types from the LSA module.

14. The system defined by claim 13 wherein the call types include LsaLogonUserEx2 API and CreateTokenEx calls and the shim layer passes all other calls from the LSA module to the plug-ins.

15. The system defined by claim 1 wherein the agent accepts other current context information used to determine whether the agent will approve authentication, said authentication being one of a log-on, a Run As process start, and acceptance of a network connection, and upon approving an authentication, the agent returns information to the LSA shim layer, said information including group membership and privileges which apply to the logged-on user, Run As user, or network-connected user.

16. The system defined by claim 15 wherein when a log-on, Run As, network connection, or other authentication event is approved, the LSA shim layer specifies the user's group membership and privileges to the LSA module which uses that information to request a process token from the Windows kernel.

17. The system defined by claim 1 further comprising a knowledgeable process which is configured to perform authentication and authorization tasks not available through standard authentication and authorization protocols.

18. The system defined by claim 17 wherein said knowledgeable process makes requests of the authentication agent using a custom application programming interface (API).

19. The system defined by claim 18 wherein said knowledgeable process is a role-switching application in which a user starts a new process instead of using a standard Run As process, and when the user requests a role change, the knowledgeable process uses the custom API to check the role change with the authentication agent and the authentication agent checks with the custom said authentication and authorization data store and allows the role change if the data store says the change is allowed for the user and the shim layer passes on user name, group membership, and privileges to the LSA module, which uses them to request a security token from the Windows kernel, which creates said security token and assigns said token to the newly started process.

20. A method for creating conditional process tokens in a computer network environment comprising:
   a) during a user logon process initiated by an operating system kernel in which a user name and password are entered, calling a local security authority (LSA) module to request a user authentication based on said user name and password;
   b) intercepting the call to the LSA module to request the user authentication and authorization;
   c) determining a current context, said context including at least a date, time and computer identity;
   d) requesting said user authentication and authorization from a custom authentication and authorization data store;
   e) if said authenticating is successful, determining group memberships and privileges to associate with said authenticated user name, password and context combination;
   f) returning the user's group memberships and privileges to the LSA shim layer;
   g) returning said user name, group memberships and privileges to said LSA module;
   h) requesting a standard process token of said operating system kernel using said user name, group memberships, and privileges.

21. The method defined by claim 20 wherein said current context includes a list of processes currently executing.

22. The method defined by claim 20 further comprising determining a level of auditing being performed and including said determined level as part of said current context.

* * * * *